US008641124B1

(12) United States Patent
Yue

(10) Patent No.: US 8,641,124 B1
(45) Date of Patent: Feb. 4, 2014

(54) FOLDABLE TONNEAU COVER AND HINGE THEREFOR

(75) Inventor: Shiawdar Shaun Yue, Cupertino, CA (US)

(73) Assignee: CYC Engineering, Inc., Fremont, CA (US)

( * ) Notice: Subject to any disclaimer, the term of this patent is extended or adjusted under 35 U.S.C. 154(b) by 0 days.

(21) Appl. No.: 13/598,900

(22) Filed: Aug. 30, 2012

(51) Int. Cl.
*B60P 7/02* (2006.01)
(52) U.S. Cl.
USPC .................................................. 296/100.09
(58) Field of Classification Search
USPC ............................ 296/100.06–100.1, 100.14, 296/100.17–100.18
See application file for complete search history.

(56) References Cited

U.S. PATENT DOCUMENTS

| 255,809 | A | * | 4/1882 | Pfauntz et al. | 16/366 |
| 277,925 | A | * | 5/1883 | Pfauntz | 16/366 |
| 2,502,642 | A | * | 4/1950 | Currlin | 411/303 |
| 3,649,073 | A | * | 3/1972 | Whittemore | 296/100.08 |
| 4,749,320 | A | * | 6/1988 | Gutt | 411/304 |
| 6,994,393 | B2 | * | 2/2006 | Votruba et al. | 296/100.06 |

* cited by examiner

*Primary Examiner* — Dennis Pedder

(57) ABSTRACT

A hinge for a foldable tonneau cover is provided and has two pivotal members, a base member and two detachable screwing assemblies. Each of the pivotal members is connected to at least one frame member of a frame section and has at least one first through hole. The base member has at least two second through holes, each of which is corresponding to the first through hole of each of the pivotal members. Each of the detachable screwing assemblies has a bolt member and a nut member. The bolt member has a thread rod, the nut member has a thread hole provided with a tight fitting member inserted therein, and the thread rod of the bolt member is screw-connected to the thread hole of the nut member and tightly fitted with the tight fitting member in the thread hole.

10 Claims, 12 Drawing Sheets

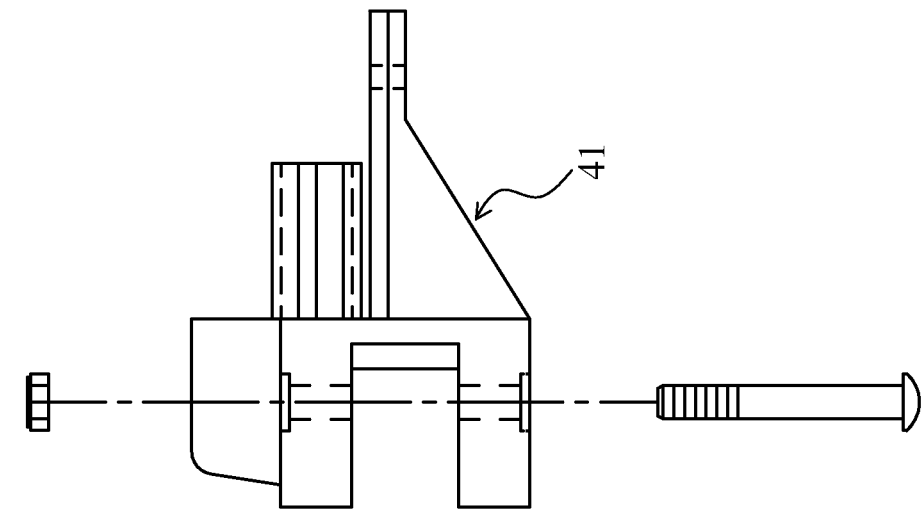
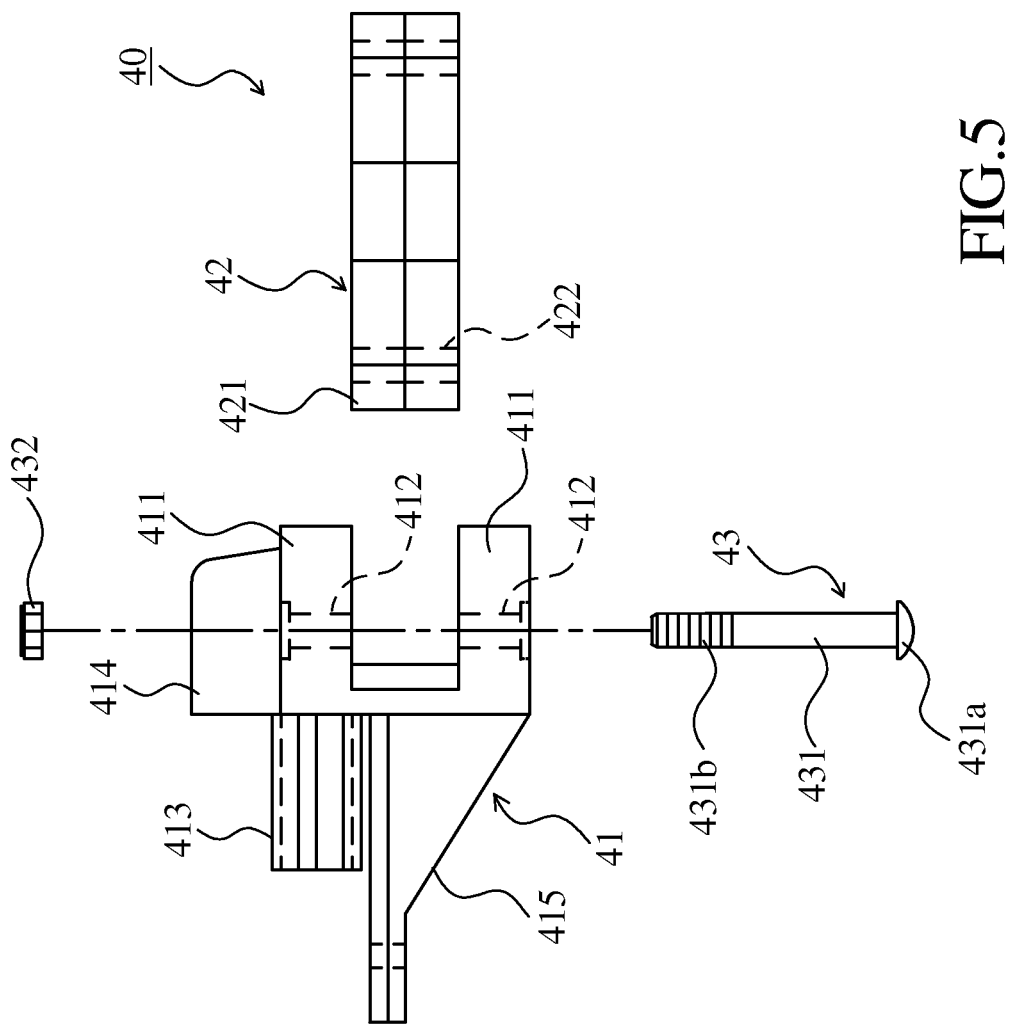
FIG.5

FOLDABLE TONNEAU COVER AND HINGE THEREFOR

FIELD OF THE INVENTION

The present invention relates to a tonneau cover and a hinge for the tonneau cover, and more particularly to a tonneau cover and a hinge for the foldable tonneau cover having detachable screwing assemblies.

BACKGROUND OF THE INVENTION

A pick-up truck has a cargo box used to carry various cargos. Generally, the cargo box is covered by a tonneau cover which is releasably clamped to and extended above the cargo box, so as to protect the carried cargos from adverse weather and improve the aesthetic appearance of the pick-up truck. The tonneau covers can be classified into hard-top type and soft-top type, wherein the hard-top type tonneau cover has a hard top made of rigid material, such as metal, fiberglass or the like, while the soft-top type tonneau cover has a soft top made of flexible material, such as canvas, vinyl plastic or a weather-resistant fabric. Moreover, the tonneau cover can be designed to provide a foldable function to help a user to conveniently extend or store the tonneau cover.

Referring now to FIG. 1 and, schematic views of a traditional foldable tonneau cover system of a pick-up truck are illustrated, wherein a tonneau cover system 10 is used to cover a cargo box 21 of a pick-up truck 20, and the tonneau cover system 10 comprises a plurality of frame sections 11, 12, 13, a plurality of hinges 14, a plurality of clamps 15 and at least one cover portions 16. The number of the cover portion 16 can be one or corresponding to that of the frame sections 11-13. The cover portion 16 is made of flexible or rigid material, and can be suitably fixed on the corresponding frame sections 11-13, and can be simultaneously folded when the tonneau cover system 10 is folded. Each of the frame sections 11 is constructed by a plurality of frame members, all of which are made of metal (such as steel, stainless steel, copper, aluminum, equivalent rigid metal or alloy thereof), engineering plastic or even wood. One of the frame sections 11, 13 can be pivotally connected to another adjacent frame section 12 through two or more of the hinges 14, so that all of the frame sections 11-13 can be adjusted to an extended position or a storage position. When the frame sections 11 are in the extended position, the frame sections 11-13 are horizontally extended on two side walls 22 and a tailgate 23 of the cargo box 21, so as to cover an inner space of the cargo box 21. When the frame sections 11-13 are in the storage position, the frame sections 11-13 are folded and stacked on a front end of the two side walls 22, so as to expose the inner space of the cargo box 21.

In the tonneau cover system 10, each of the hinges 14 mainly comprises two pivotal members 141 and a base member 142, wherein each of the pivotal members 141 is installed on frame members of one of the frame sections 11-13, while the base member 142 is pivotally connected between the two pivotal members 141 through two rivet members (not-shown). However, once the base member 142 and the two pivotal members 141 are connected to each other by the rivet members, heads of the rivet members will be deformed to ensure the installation relationship between the base member 142 and the two pivotal members 141. However, after the hinge 14 is long-term used, the base member 142 may be easily damaged, but the base member 142 still can not be detached from the two pivotal members 141 due to the permanent deformation of the heads of the rivet members. As a result, the entire hinge 14 including the two pivotal members 141, the base member 142 and the rivet members must be simultaneously disassembled from the frame members of the frame sections 11-13, so as to complicate the disassembling operation, destroy the original frame construction of the frame sections 11-13 to affect the structural reliability of the frame sections, and increase the maintenance cost of replaced components.

As a result, it is necessary to provide a tonneau cover and a hinge for the foldable tonneau cover to solve the problems existing in the conventional technologies, as described above.

SUMMARY OF THE INVENTION

A primary object of the present invention is to provide a tonneau cover and a hinge for the foldable tonneau cover, wherein the hinge has two pivotal members, a base member and two detachable screwing assemblies, wherein each of the pivotal members is pivotally connected to the base member by one of the detachable screwing assemblies, each of which includes a bolt member and a nut member, and the nut member has a thread hole provided with a tight fitting member inserted therein, so that a thread rod of the bolt member can screw-connect to the thread hole of the nut member and tightly fit with the tight fitting member, so as to prevent from separating from the nut member. After the hinge is long-term used and the base member is damaged, the bolt member can be separated from the nut member by using a screwing tool, so that the base member can be disassembled/detached from the two pivotal members for conveniently replacing this original base member by a new base member. Because it is unnecessary to disassemble the two pivotal members from frame members of the frame sections, the original frame construction of the frame sections will not be disassembled, so that the disassembling operation can be simplified, the structural reliability of the frame sections can be ensured, and the maintenance cost of replaced components will be lowered.

To achieve the above object, the present invention provides a hinge for a foldable tonneau cover of a pick-up truck, which comprises:

two pivotal members, each of which is connected to at least one frame member of a frame section and has at least one first through hole;

a base member having at least two second through holes, each of which is corresponding to the first through hole of each of the pivotal members; and two detachable screwing assemblies, each of which has a bolt member and a nut member, wherein the bolt member has a thread rod, the nut member has a thread hole provided with a tight fitting member inserted therein, and the thread rod of the bolt member is screw-connected to the thread hole of the nut member and tightly fitted with the tight fitting member in the thread hole.

In one embodiment of the present invention, the tight fitting member is a hollow cylindrical plastic member.

In one embodiment of the present invention, the thread hole of the nut member includes a thread portion and an annular groove which is formed adjacent to the thread portion and has a diameter slight greater than that of the thread portion, and the tight fitting member is mounted in the annular groove.

In one embodiment of the present invention, the tight fitting member has a tight fitting hole with a diameter slightly smaller than that of the thread portion of the nut member.

In one embodiment of the present invention, an outer diameter of the tight fitting member is substantially equal to or slightly greater than an inner diameter of the annular groove.

In one embodiment of the present invention, each of the pivotal members has a pair of extension arms, and each of the extension arms is formed with one of the first through hole.

In one embodiment of the present invention, the base member has two protruded portions, and each of the protruded portions is formed with one of the second through holes.

In one embodiment of the present invention, each of the protruded portions of the base member is disposed between the two extension arms of each of the pivotal members.

In one embodiment of the present invention, the first through hole is a stepped hole.

In one embodiment of the present invention, the pivotal members are made of metal (such as steel, stainless steel, copper, aluminum, equivalent rigid metal or alloy thereof) or engineering plastic (mainly including polyamide (PA6), polyamide 66 (PA66), polypropylene (PP), acrylonitrile-butadiene-styrene (ABS) copolymer, polycarbonate (PC), polybutylene terephthalate (PBT) and the equivalent).

In one embodiment of the present invention, the base member is made of metal or engineering plastic.

In one embodiment of the present invention, the bolt member and the nut member are made of metal.

Furthermore, the present invention further provides a foldable tonneau cover of a pick-up truck, which comprises:

at least two frame sections having a plurality frame members and a cover portion; and a plurality of hinges pivotally connecting two of the adjacent frame sections, and each of the hinges comprising:

two pivotal members, each of which is connected to the frame members of the frame section and has at least one first through hole;

a base member having at least two second through holes, each of which is corresponding to the first through hole of each of the pivotal members; and two detachable screwing assemblies, each of which has a bolt member and a nut member, wherein the bolt member has a thread rod, the nut member has a thread hole provided with a tight fitting member inserted therein, and the thread rod of the bolt member is screw-connected to the thread hole of the nut member and tightly fitted with the tight fitting member in the thread hole.

In one embodiment of the present invention, the cover portion is a rigid metal plate, and each of the frame members is formed with an installation slot, a C-shaped insertion groove and a linear installation groove.

In one embodiment of the present invention, an outer edge of the cover portion is inserted into the linear installation groove.

In one embodiment of the present invention, each of the pivotal members has an insertion portion and a reinforcement rib plate, wherein the insertion portion and the reinforcement rib plate are inserted into the installation slot and the C-shaped insertion groove, respectively.

In one embodiment of the present invention, each of the hinges further comprises two connection members, each of which has a first installation block, a connection portion and a second installation block; wherein the connection portion is connected between the first and second installation blocks.

In one embodiment of the present invention, the first installation block is screw-connected to the reinforcement rib plate of the corresponding frame member and the cover plate.

In one embodiment of the present invention, an inner edge of the cover portion has a bent engagement portion which is screw-connected to the second installation block.

DESCRIPTION OF THE DRAWINGS

FIG. 5 is a bottom view of the hinge according to the first embodiment of the present invention;

DETAILED DESCRIPTION OF THE PREFERRED EMBODIMENTS

The structure and the technical means adopted by the present invention to achieve the above and other objects can be best understood by referring to the following detailed description of the preferred embodiments and the accompanying drawings. Furthermore, directional terms described by the present invention, such as upper, lower, front, back, left, right, inner, outer, side, longitudinal/vertical, transverse/horizontal, and etc., are only directions by referring to the accompanying drawings, and thus the used directional terms are used to describe and understand the present invention, but the present invention is not limited thereto.

Figure 1:
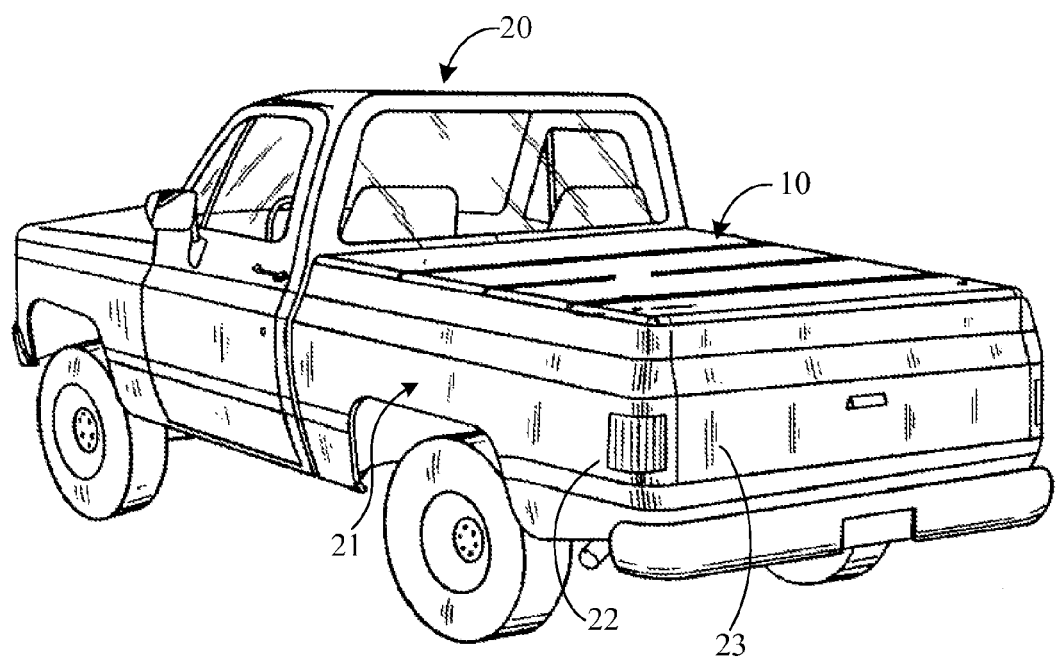
FIG. 1 is a schematic view of a traditional foldable tonneau cover system of a pick-up truck.
Figure 2:
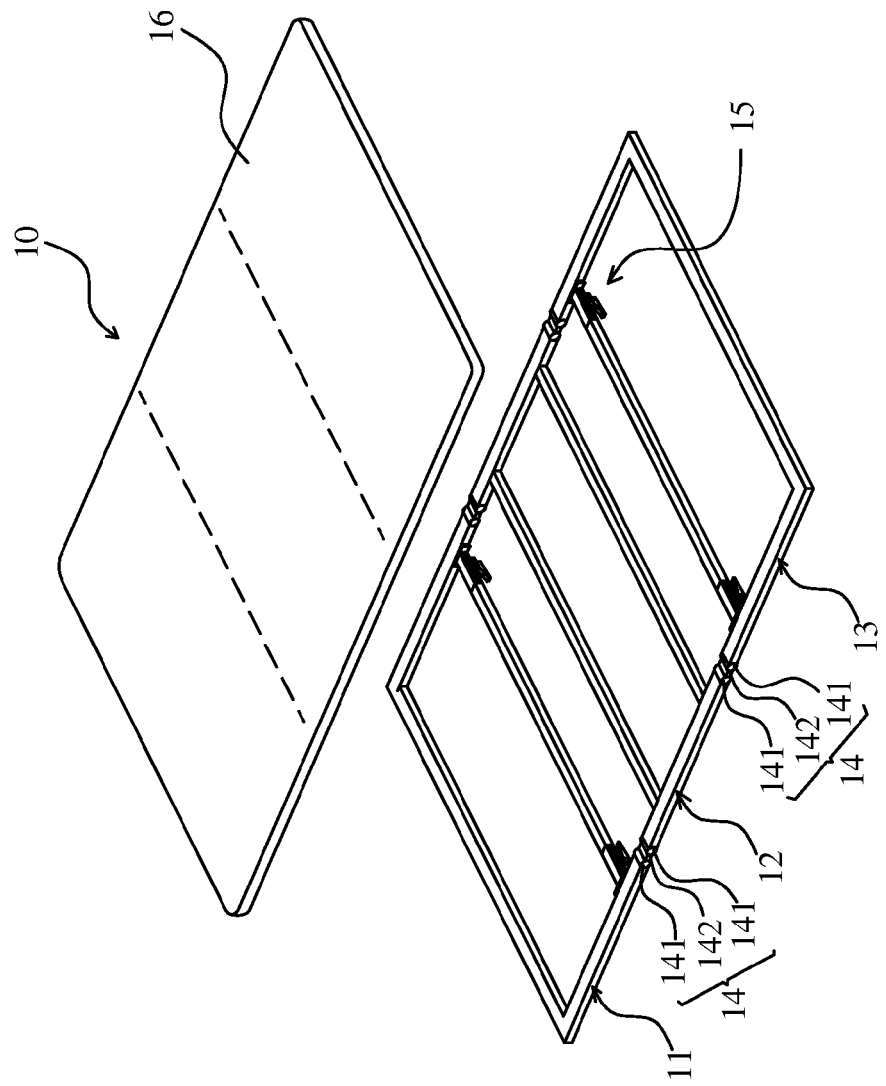
FIG. 2 is an exploded perspective view of the traditional foldable tonneau cover system as shown in FIG. 1.
Figure 3:
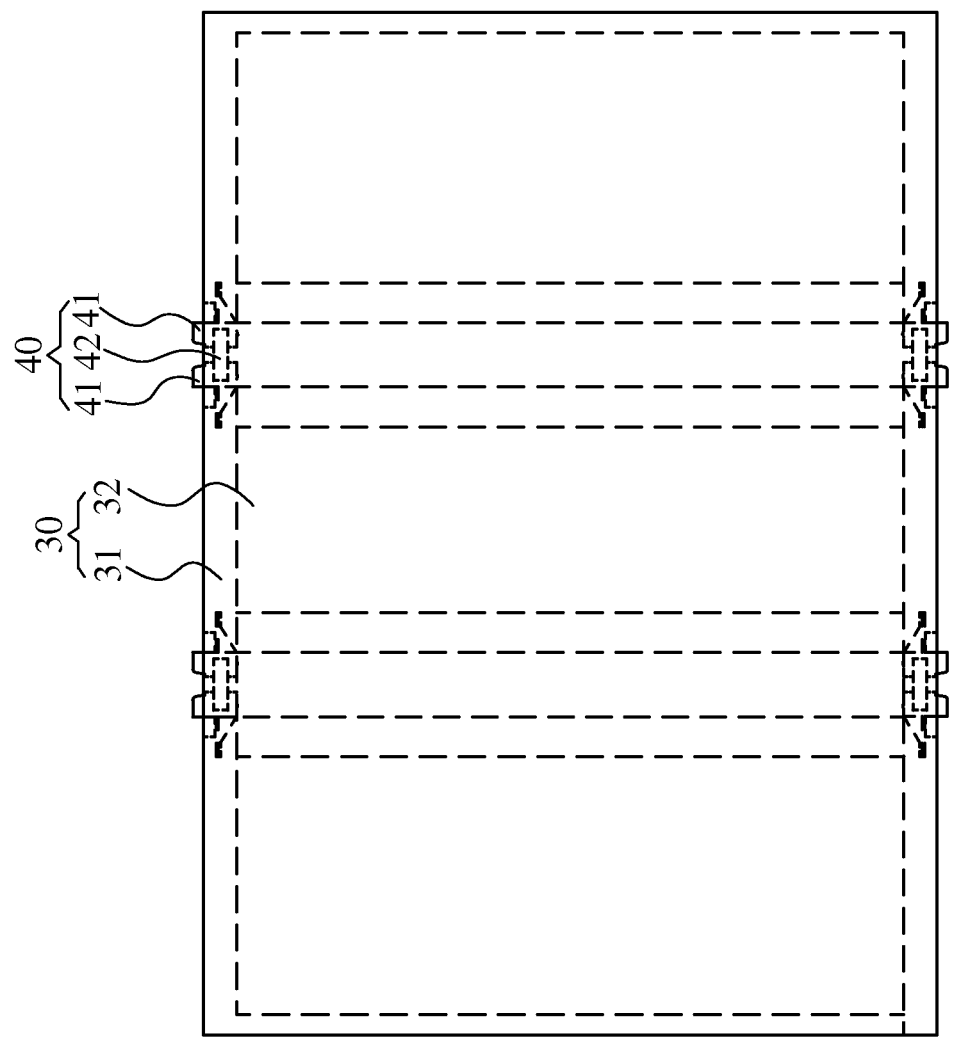
FIG. 3 is an assembled perspective view of a foldable tonneau cover of a pick-up truck with hinges according to a first embodiment of the present invention.
Figure 4:
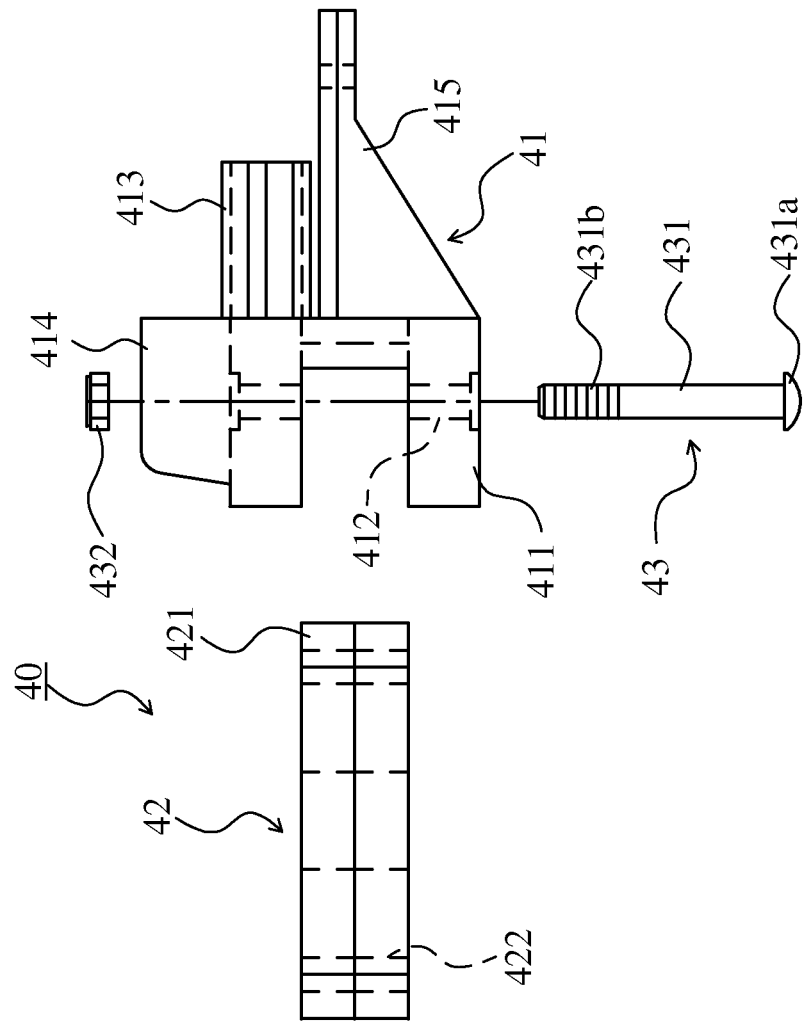
FIG. 4 is a top view of a hinge according to the first embodiment of the present invention, as shown in FIG. 3.
Figure 6:
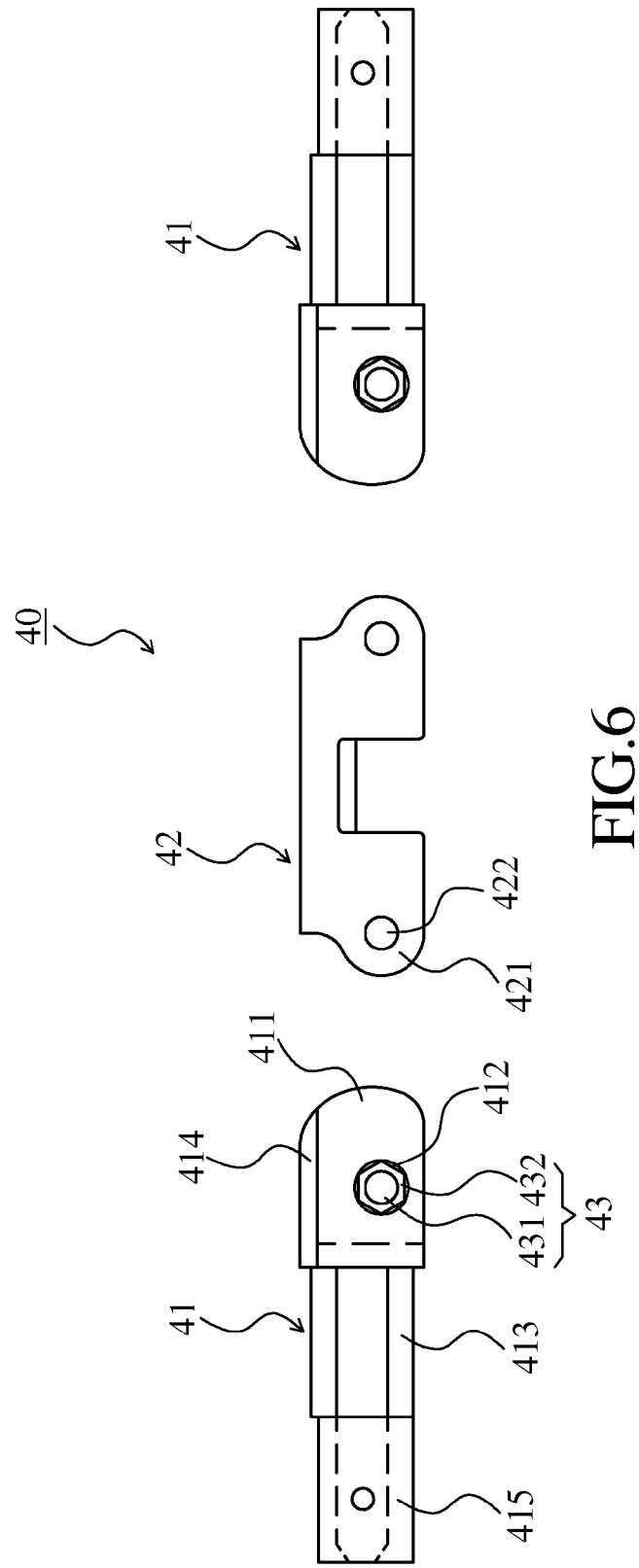
FIG. 6 is a front view of the hinge according to the first embodiment of the present invention.
Figure 7:
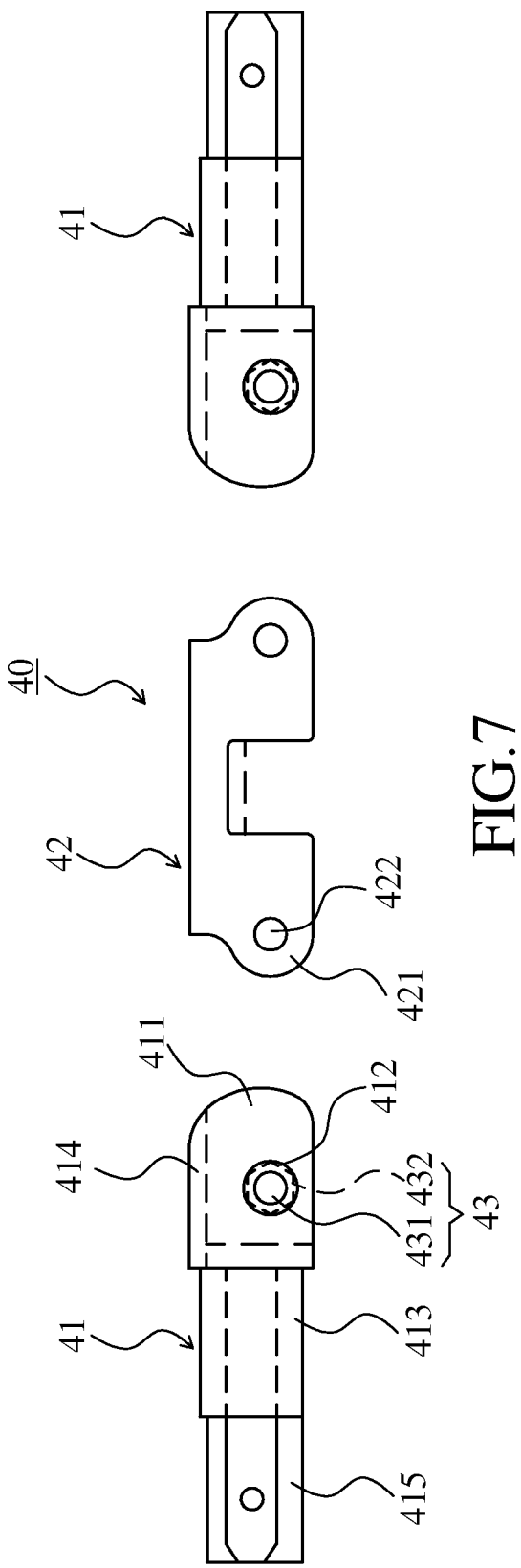
FIG. 7 is a rear view of the hinge according to the first embodiment of the present invention.
Figure 8:
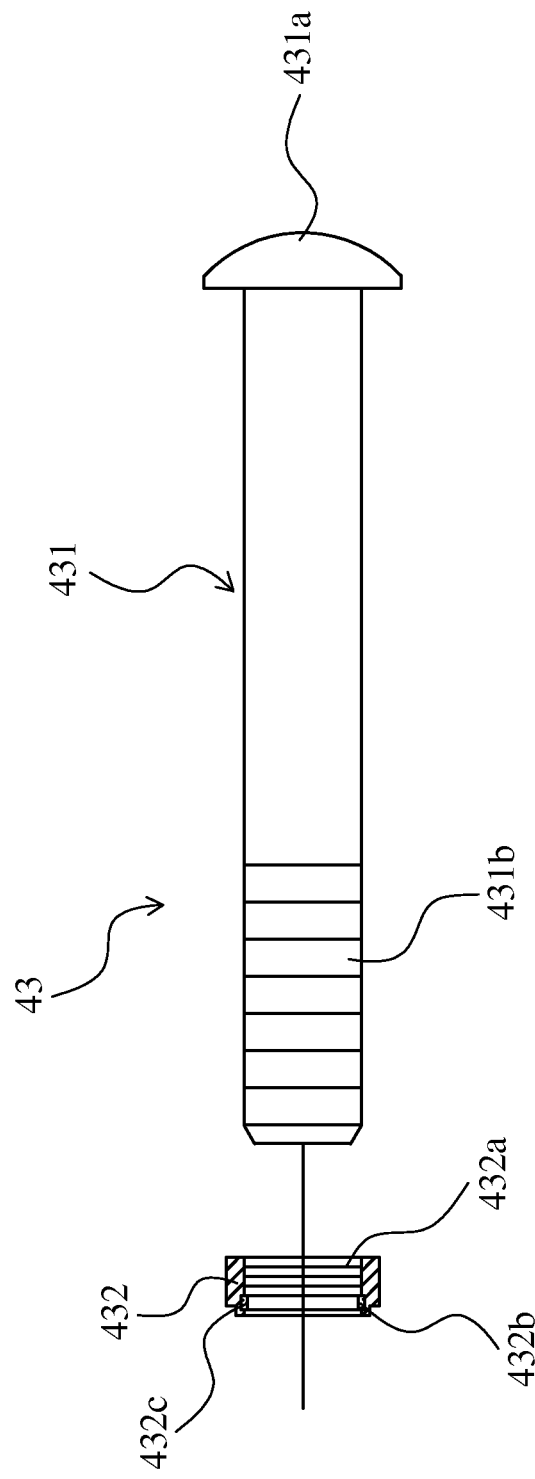
FIG. 8 is an exploded cross-sectional view of a detachable screwing assembly of the hinge according to the first embodiment of the present invention.

Referring now to FIG. 3, an assembled perspective view of a foldable tonneau cover of a pick-up truck with hinges according to a first embodiment of the present invention is illustrated. As shown, a plurality of hinges of the present invention are applied to a foldable tonneau cover of a pick-up truck, wherein the foldable tonneau cover comprises a plurality of frame sections 30, a plurality of hinges 40, a plurality of clamps (not-shown). Each of the frame sections 30 has a plurality of frame members 31 and a cover portion 32. The cover portion 32 is made of flexible or rigid material, and can be suitably fixed on the corresponding frame sections 30, and can be simultaneously folded when the foldable tonneau cover is folded. In the embodiment, the cover portion 32 is made of flexible material. The number of the cover portion 32 can be one or corresponding to that of the frame sections 30, such as three or four, without limitation. Each of the frame sections 30 is constructed by the frame members 31, all of which are made of metal (such as steel, stainless steel, copper, aluminum, equivalent rigid metal or alloy thereof), engineering plastic or even wood. One of the frame sections 30 can be pivotally connected to another adjacent frame section 30 through two or more of the hinges 40, so that all of the frame sections 30 can be adjusted to an extended position or a storage position. When the frame sections 30 are in the extended position, the frame sections 30 are horizontally extended on two side walls and a tailgate of a cargo box (as shown in FIG. 1), so as to cover an inner space of the cargo box. When the frame sections 30 are in the storage position, the frame sections 30 are folded and stacked on a front end of the two side walls, so as to expose the inner space of the cargo box.

Referring to FIGS. 3 to 8, in the first embodiment of the present invention, each of the hinges 40 is installed on two corners (or other portions of two frame members 31) of two adjacent frame sections 30. Each of the hinges 40 comprises two pivotal members 41, a base member 42 and two detachable screwing assemblies 43, wherein the pivotal members and the base member 42 are made of metal (such as steel, stainless steel, copper, aluminum, equivalent rigid metal or alloy thereof) or engineering plastic (mainly including polyamide 6 (PA6), polyamide 66 (PA66), polypropylene (PP), acrylonitrile-butadiene-styrene (ABS) copolymer, polycarbonate (PC), polybutylene terephthalate (PBT) and the equivalent), without limitation; and the detachable screwing assemblies 43 are made of metal. Each of the pivotal members 41 is connected to at least one frame member 31 of the frame section 30, and has at least one extension arm 411, at least one first through hole 412, an insertion portion 413, a wing portion 414 and a reinforcement rib plate 415. The extension arm 411, the first through hole 412 and the wing portion 414 are formed on a side of the pivotal member 41 facing the base member 42, while the insertion portion 413 and the reinforcement rib plate 415 are formed on the opposite side of the pivotal member 41 facing the frame member 31.

Furthermore, the first through hole 412 is formed on the extension arm 411, and the number of the first through hole 412 is preferably corresponding to that of the extension arm 411. In the embodiment, the number of the first through hole 412 and the extension arm 411 is two, and there is a gap defined between the two extension arms 411 to install one portion of the base member 42. The two first through holes 412 of one of the pivotal members 41 can be used to install one of the detachable screwing assemblies 43. Each of the first through holes 412 is preferably a stepped hole having a stepped portion (unlabeled). Moreover, the insertion portion 413 (and the reinforcement rib plate 415) of the pivotal member 41 can be inserted into an inner space of the frame member 31, in order to mount the pivotal member 41 on the frame member 31. The wing portion 414 is extended from a side of one of the two extension arms 411 relatively away from the frame member 31, and the wing portion 414 is used to guide a peripheral flexible sheet (not-shown) to simultaneously bend when the two adjacent frame sections 30 are folded.

Referring to FIGS. 3 to 8, in the first embodiment of the present invention, the base member 42 has two protruded portions 421 extended from two sides thereof, and each of the protruded portions 421 is formed with one of the second through holes 422. Each set of the protruded portion 421 and its second through holes 422 are corresponding to the two extension arms 411 and the two first through holes 412 of each of the pivotal members 41. In other words, the protruded portion 421 of the base member 42 is disposed in the gap defined between the two extension arms 411 of each of the pivotal members 41.

Referring to FIGS. 4 to 8, in the first embodiment of the present invention, each of the two detachable screwing assemblies 43 has a bolt member 431 and a nut member 432, wherein the bolt member 431 has a bolt head 431a and a thread rod 431b. The bolt head 431a and the thread rod 431b are formed on two ends of the bolt member 431. The bolt head 431a can be disposed in the stepped portion of one of the first through holes 412. The thread rod 431b can be screw-connect into a thread hole 432a of the nut member 432. The nut member 432 can be disposed in the stepped portion of the other of the first through holes 412. The thread hole 432a of the nut member 432 includes a thread portion (i.e. the labeled portion of "432a") and an annular groove 432b. In the thread hole 432a, the annular groove 432b is formed adjacent to the thread portion, and has a diameter slightly greater than that of the thread portion. Furthermore, the nut member 432 is provided with a tight fitting member 432c which is inserted and mounted in the annular groove 432b. The thread portion of the thread hole 432a has an inner diameter substantially equal or slightly smaller than an outer diameter of the thread rod 431b.

The tight fitting member 432c is a hollow cylindrical plastic member. The tight fitting member 432c has a tight fitting hole (unlabeled) with a diameter slightly smaller than that of the thread portion in the thread hole 432a, while an outer diameter of the tight fitting member 432c is substantially equal to or slightly greater than an inner diameter of the annular groove 432b. In assembling, the tight fitting member 432c is firstly inserted into the annular groove 432b, and then an opening of the nut member 432 close to the annular groove 432b and original having a diameter greater than that of the annular groove 432b is punched to be deformed until the diameter of the opening is smaller than that of the annular groove 432b. Thus, the tight fitting member 432c will be fixedly mounted in the annular groove 432b and will not be separated from the opening of the nut member 432.

Referring to FIGS. 3 to 8, in the first embodiment of the present invention, when assembling the hinge 40, the base member 42 is firstly disposed between the two pivotal members 41, and each set of the protruded portion 421 and its second through holes 422 are correspondingly disposed between the two extension arms 411 and the two first through holes 412 of each of the pivotal members 41. Then, the thread rod 431b of the bolt member 431 passes through the two first through holes 412 and the second through hole 422, and the nut member 432 is pre-disposed in one of the first through holes 412. The thread rod 431b of the bolt member 431 is screw-connected to the thread hole 432a of the nut member 432 and tightly fitted with the tight fitting hole of the tight fitting member 432c in the thread hole 432a. The tightly fitting relationship between the thread rod 431b and the tight fitting member 432c can prevent the thread rod 431b from being separated from the thread hole 432a of the nut member 432. After the hinge 40 is assembled, the hinge 40 can be installed on the frame members 31 of the frame sections 30, so as to construct the foldable tonneau cover.

After the hinge 40 is long-term used, the base member 42 may be damaged. At this time, the bolt member 431 can be separated from the nut member 432 by using a screwing tool, so that the originally damaged base member 42 can be disassembled/detached from the two pivotal members 41 for conveniently replacing this original base member 42 by a new base member 42. Meanwhile, the original pivotal members 41, bolt member 431 and nut member 432 still can be used. Because it is unnecessary to disassemble the two pivotal members 41 from the frame members 31 of the frame sections 30, the original frame construction of the frame sections 30 will not be disassembled, so that the disassembling operation can be simplified, the structural reliability of the frame sections 30 can be ensured, and the maintenance cost of replaced components will be lowered.

Figure 9:
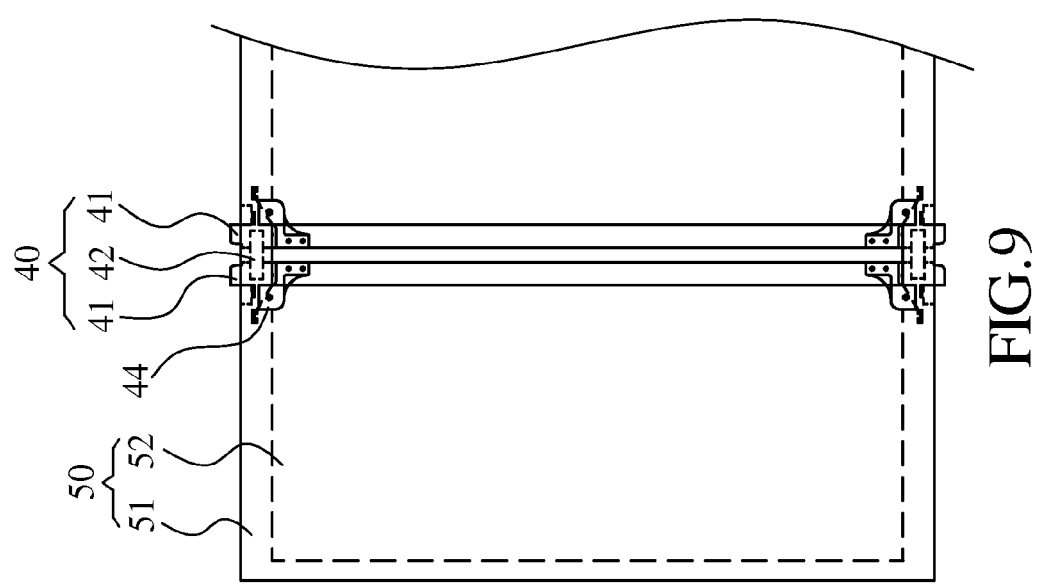
FIG. 9 is an assembled perspective view of a foldable tonneau cover of a pick-up truck according to a second embodiment of the present invention.
Figure 10:
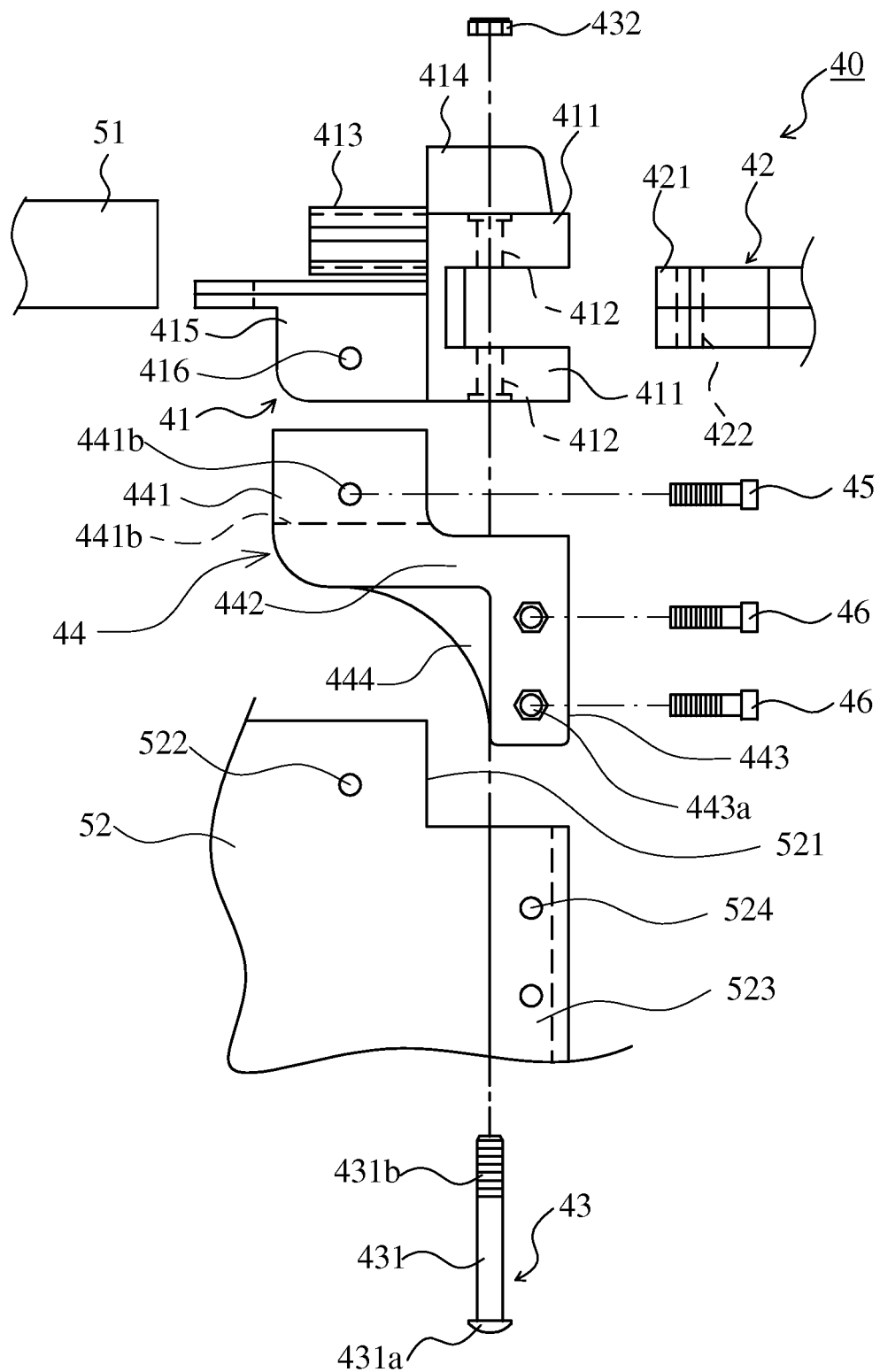
FIG. 10 is a partially exploded bottom view of the hinge according to the second embodiment of the present invention.
Figure 11:
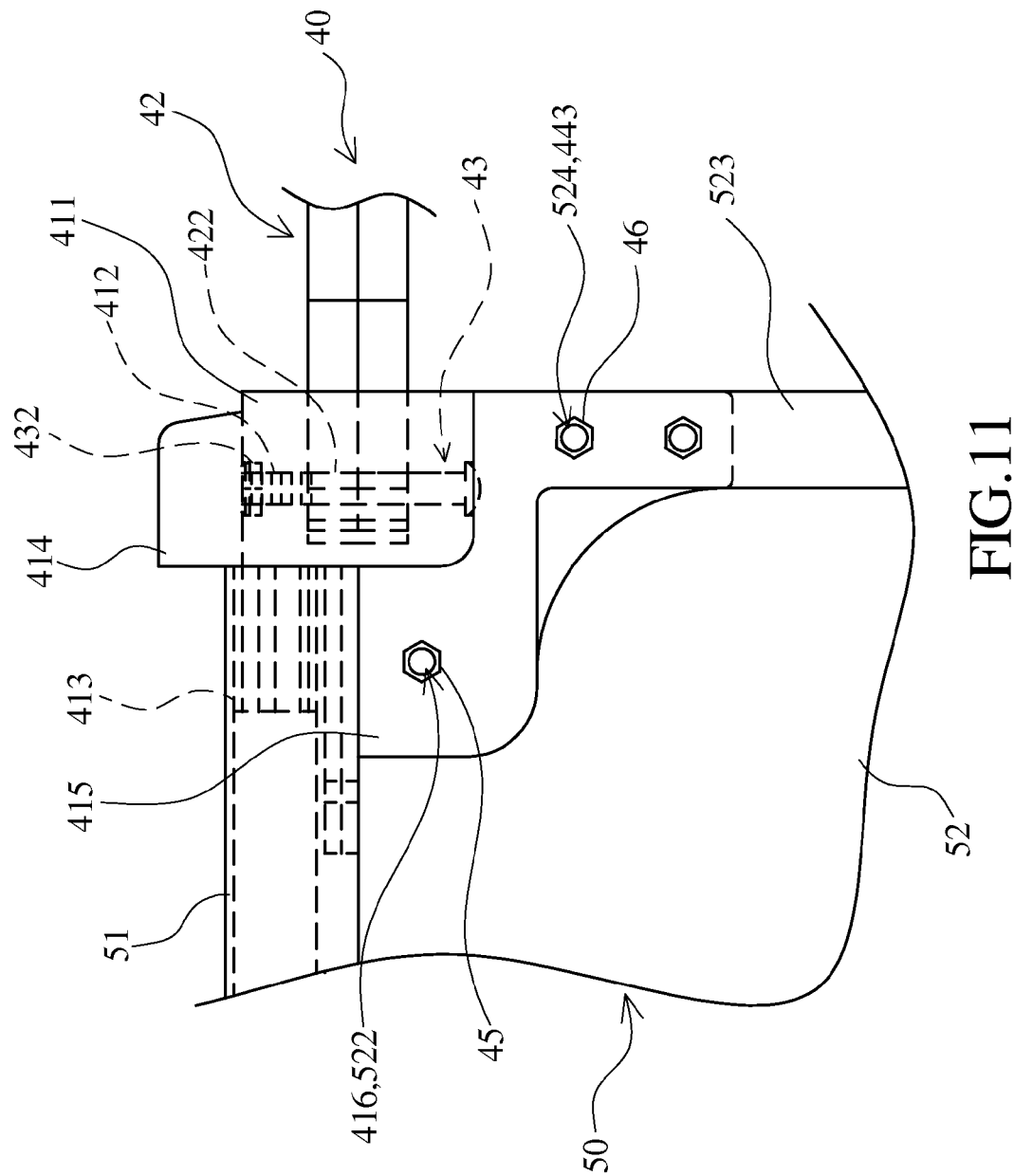
FIG. 11 is a partially assembled bottom view of the foldable tonneau cover according to the second embodiment of the present invention.

Referring now to FIGS. 9 to 11, a hinge for a foldable tonneau cover of a pick-up truck according to a second embodiment of the present invention is illustrated and similar to the first embodiment, so that the second embodiment uses similar terms or numerals of the first embodiment. As shown, the difference of the second embodiment is that: a plurality of hinges 40 are applied to a plurality of frame sections 50, each of which has a plurality of frame members 51 and a cover portion 52, and the cover portion 52 is made of rigid metal plate. Meanwhile, each of the hinges 40 comprises two pivotal members 41, a base member 42, two detachable screwing assemblies 43, two connection members 44, at least two first screw members 45 and at least two second screw members 46.

Figure 10A:
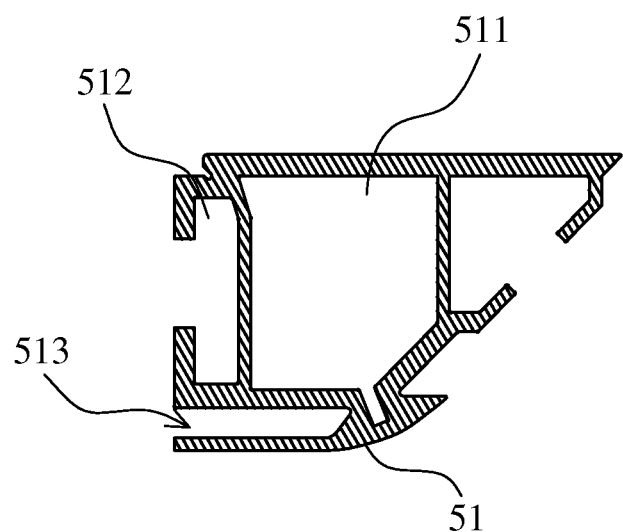
FIG. 10A is a partially enlarged cross-sectional view of the frame member according to the second embodiment of the present invention.
Figure 10B:
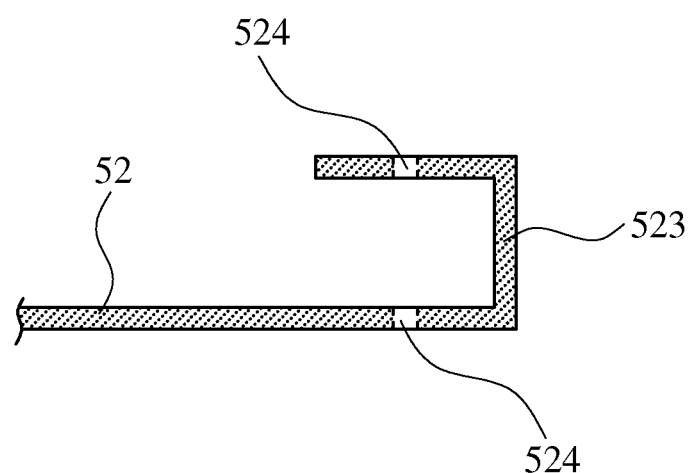
FIG. 10B is a partially enlarged cross-sectional view of the cover portion according to the second embodiment of the present invention.

Referring to FIGS. 10, 10A and 10B, in the second embodiment, each of the frame sections 50 is constructed by the frame members 51, all of which are made of metal (such as steel, stainless steel, copper, aluminum, equivalent rigid metal or alloy thereof), engineering plastic or even wood. Each of the frame members 51 is formed with an installation slot 511 therein, a C-shaped insertion groove 512 on an inner surface thereof and a linear installation groove 513 on the inner surface. The number of the cover portion 52 can be corresponding to that of the frame sections 50, such as three or four, without limitation. Each of the cover portions 52 has a cutout portion 521, at least one first installation hole 522, a bent engagement portion 523 and at least one second installation hole 524, wherein the cutout portion 521 provides an installation space at the corner of the cover portion 52 to receive one of the extension arms 411; the first installation hole 522 is formed on an outer edge of the cover portion 52 relatively close to the reinforcement rib plate 415; the bent engagement portion 523 and the second installation hole 524 are formed on an inner edge of the cover portion 52 relatively close to the other adjacent frame section 50; and the bent engagement portion 523 are a U-shaped groove structure formed by bending the inner edge of the cover portion 52. The first installation hole 522 and the second installation hole 524 generally are through holes.

Referring to FIG. 10, in the second embodiment, the two pivotal members 41, the base member 42 and the detachable screwing assemblies 43 are substantially similar to that of the first embodiment, but the reinforcement rib plate 415 is additionally formed with an installation hole 416 which can be a through hole or a thread hole. Furthermore, the connection members 44 are made of the same material as the pivotal members 41 and the base member 42, but not limited thereto. Each of the connection members 44 is formed with a first installation block 441, a connection portion 442, a second installation block 443 and a reinforcement rib portion 444. The first installation block 441 has an engagement groove 441a therein, and two first screwing holes 441b, wherein the first installation block 441 has a U-shaped cross-sectional structure to form the engagement groove 441a, and the two first screwing holes 441b are formed at two side of the engagement groove 441a, wherein the first screwing holes 441b can be through holes or thread holes. The connection portion 442 has a first end vertically connected to the first installation block 441 and a second end vertically connected to the second installation block 443. The first installation block 441 is extended outward from the connection portion 442, while the second installation block 443 is extended inward from the connection portion 442. The second installation block 443 has at least one second screwing hole 443a, wherein the second screwing hole 443a can be through holes or thread holes. The reinforcement rib portion 444 is used to connect the first installation block 441, the connection portion 442 and the second installation block 443 for reinforcing the structural strength of the connection member 44.

Referring still to FIGS. 9 to 11, in the second embodiment of the present invention, when assembling the hinge 40 and the frame sections 50, the insertion portion 413 of the pivotal member 41 is firstly inserted into and engaged with the installation slot 511 of the frame member 51, and an extension rod (unlabeled) of the reinforcement rib plate 415 is simultaneously inserted into the C-shaped insertion groove 512, in order to mount the pivotal member 41 on the frame member 51, wherein the extension rod (and/or the insertion portion 413 can be further screw-connected to the frame member 51 through at least one screw member (not-shown). Then, an outer edge of the cover portion 52 is inserted into the linear installation groove 513. Finally, the cover portion 52 is screw-connected to the connection member 44 and the reinforcement rib plate 415 of the pivotal member 41 through the first screw member 45 and the second screw members 46. In details, the first screw member 45 passes through the first screwing holes 441b, the installation hole 416 and the first installation hole 522 from bottom to top, and then is screw-connected with a nut (not-shown); Meanwhile, the second screw members 46 pass through the second installation hole 524 on the bent engagement portion 523 and the second screwing holes 443a from bottom to top, and then are screw-connected with other nuts (not-shown). Thus, the cover portion 52 can be simply and rapidly installed to the hinge 40 and the frame member 51 by the connection member 44, the bent engagement portion 523, the first screw member 45 and the second screw members, so as to construct a rigid-type foldable tonneau cover.

The present invention has been described with a preferred embodiment thereof and it is understood that many changes and modifications to the described embodiment can be carried out without departing from the scope and the spirit of the invention that is intended to be limited only by the appended claims.

What is claimed is:

1. A foldable tonneau cover of a pick-up truck, comprising:
at least two frame sections having a plurality frame members and a cover portion, wherein the cover portion is a rigid metal plate, and each of the frame members is formed with an installation slot, a C-shaped insertion groove and a linear installation groove; and
a plurality of hinges pivotally connecting two of the adjacent frame sections, and each of the hinges comprising:
two pivotal members, each of which is connected to the frame members of the frame section and has at least one first through hole;
a base member having at least two second through holes, each of which is corresponding to the first through hole of each of the pivotal members; and
two detachable screwing assemblies, each of which has a bolt member and a nut member, wherein the bolt member has a thread rod, the nut member has a thread hole provided with a tight fitting member inserted therein, and the thread rod of the bolt member is screw-connected to the thread hole of the nut member and tightly fitted with the tight fitting member in the thread hole.

2. The foldable tonneau cover of the pick-up truck according to claim 1, wherein the tight fitting member is a hollow cylindrical plastic member, and the thread hole of the nut member includes a thread portion and an annular groove which is formed adjacent to the thread portion and has a diameter slight greater than that of the thread portion, and the tight fitting member is mounted in the annular groove.

3. The foldable tonneau cover of the pick-up truck according to claim 2, wherein the tight fitting member has a tight fitting hole with a diameter slightly smaller than that of the thread portion of the nut member; and an outer diameter of the tight fitting member is substantially equal to or slightly greater than an inner diameter of the annular groove.

4. The foldable tonneau cover of the pick-up truck according to claim 1, wherein each of the pivotal members has a pair of extension arms, and each of the extension arms is formed with one of the first through hole; the base member has two protruded portions, and each of the protruded portions is formed with one of the second through holes; and each of the protruded portions of the base member is disposed between the two extension arms of each of the pivotal members.

5. The foldable tonneau cover of the pick-up truck according to claim 1, wherein the first through hole is a stepped hole.

6. The foldable tonneau cover of the pick-up truck according to claim 1, wherein an outer edge of the cover portion is inserted into the linear installation groove.

7. The foldable tonneau cover of the pick-up truck according to claim 1, wherein each of the pivotal members has an insertion portion and a reinforcement rib plate, wherein the insertion portion and the reinforcement rib plate are inserted into the installation slot and the C-shaped insertion groove, respectively.

8. The foldable tonneau cover of the pick-up truck according to claim 7, wherein each of the hinges further comprises two connection members, each of which has a first installation block, a connection portion and a second installation block; wherein the connection portion is connected between the first and second installation blocks.

9. The foldable tonneau cover of the pick-up truck according to claim 8, wherein the first installation block is screw-connected to the reinforcement rib plate of the corresponding frame member and the cover portion.

10. The foldable tonneau cover of the pick-up truck according to claim 8, wherein an inner edge of the cover portion has a bent engagement portion which is screw-connected to the second installation block.

* * * * *